United States Patent
Gui et al.

(10) Patent No.: US 7,912,833 B2
(45) Date of Patent: Mar. 22, 2011

(54) AGGREGATE JOIN INDEX UTILIZATION IN QUERY PROCESSING

(75) Inventors: Hong Gui, Middleton, WI (US); Grace Au, Rancho Palos Verdes, CA (US); Carlos Bouloy, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 409 days.

(21) Appl. No.: 12/186,199

(22) Filed: Aug. 5, 2008

(65) Prior Publication Data
US 2010/0036800 A1 Feb. 11, 2010

(51) Int. Cl.
*G06F 17/30* (2006.01)
(52) U.S. Cl. .................. 707/714; 707/802; 707/957
(58) Field of Classification Search .................. 707/714, 707/786, 802, 957, 999.002
See application file for complete search history.

(56) References Cited

U.S. PATENT DOCUMENTS

| | | | |
|---|---|---|---|
| 6,505,188 B1 | 1/2003 | Ghazal et al. | |
| 6,505,189 B1 | 1/2003 | On Au et al. | |
| 6,618,720 B1 | 9/2003 | On Au et al. | |
| 6,643,636 B1 | 11/2003 | Au et al. | |
| 6,732,096 B1 | 5/2004 | Au | |
| 7,319,997 B1 * | 1/2008 | Morris et al. | 707/714 |
| 7,321,898 B1 * | 1/2008 | Luo et al. | 1/1 |

* cited by examiner

*Primary Examiner* — Cheryl Lewis
(74) *Attorney, Agent, or Firm* — Schwegman, Lundberg & Woessner

(57) ABSTRACT

A system and method include obtaining a query and identifying an aggregate join index (AJI) at a high level of aggregation. The dimension table may be rolled-up with the grouping key being the union of the grouping key in the AJI and the grouping key of the query. The identified AJI is joined with the rolled-up dimension table to obtain columns in the query that are not in the identified AJI. The joined AJI and rolled-up dimension table are then rolled up to answer the query.

18 Claims, 3 Drawing Sheets

AGGREGATE JOIN INDEX UTILIZATION IN QUERY PROCESSING

BACKGROUND

In today's business intelligence world, On-Line Analysis Processing (OLAP) plays an important role as it extracts analytical information out of detailed transaction data. The data model used in OLAP is characterized by multiple dimensions and the hierarchy structure in each dimension.

The traditional multidimensional OLAP (MOLAP) approach uses special data structures, such as multi-dimension arrays, to store the precalculated aggregate data so it can deliver impressive query performance. But as the amount of data increases, scalability turns to be a big challenge. Relational OLAP (ROLAP) is becoming the choice for large data warehouses because of its ability to scale with large amount of data and its integration with other components in the enterprise intelligence architecture.

To achieve fast query response time, ROLAP materializes the precalculated aggregate data in table format, such as an aggregate join index (AJI). Different terminologies may be used to refer to the same data structure in a RDBMS, such as materialized view, automatic summary table etc. An optimizer decides whether an AJI can be used to answer an OLAP query based on a set of criteria. As with non-aggregate JIs, AJIs result in a need for extra storage and maintenance overhead.

DETAILED DESCRIPTION

Figure 1:
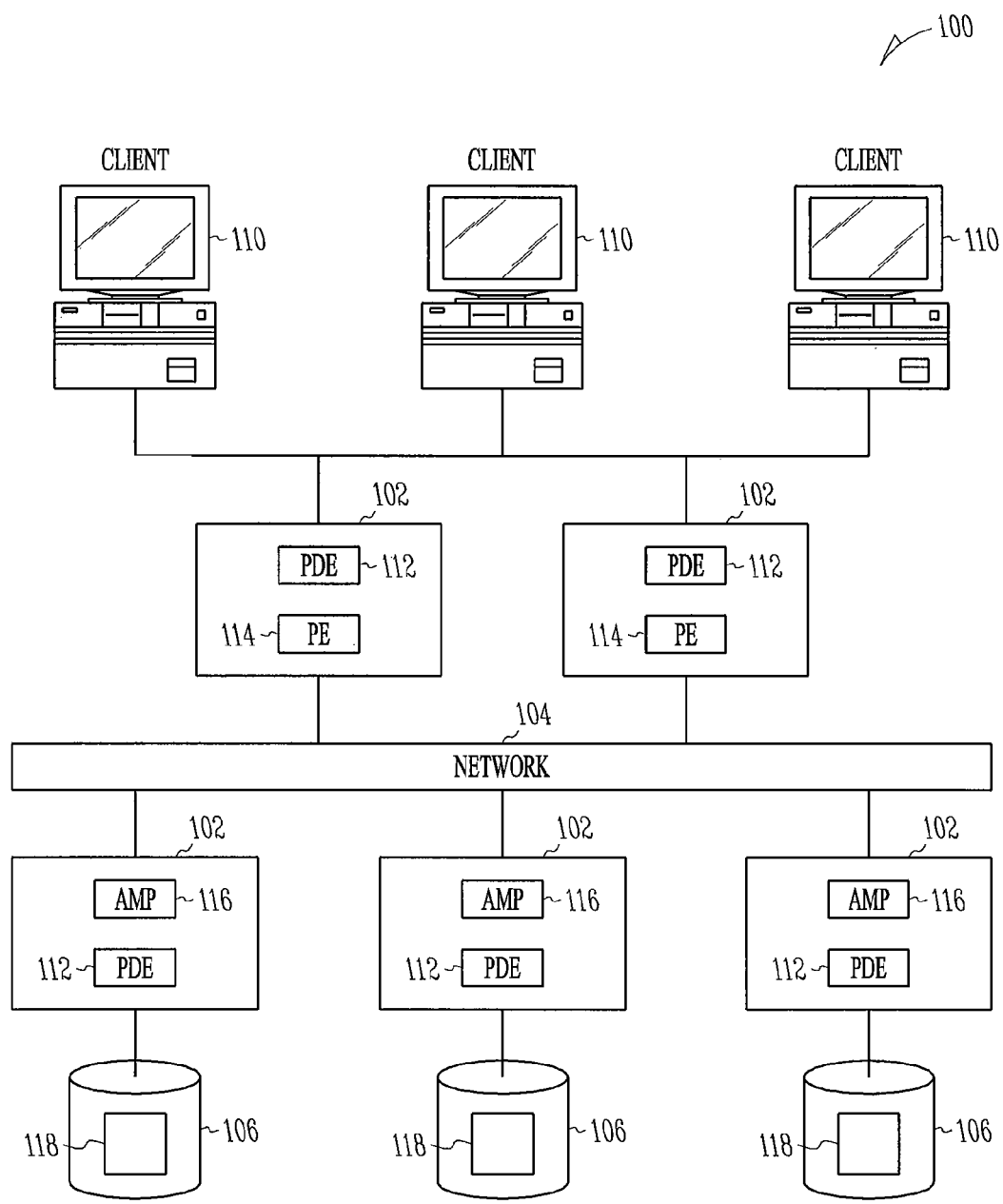
FIG. 1 is a block diagram of a hardware and software environment according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

An aggregate join index (AJI) is an index that stores the results from one or more aggregation expressions computed from one or more columns of one or more tables, along with the columns that are used as the aggregation key and a row count of each aggregated group. These pre-computed results stored in the aggregate join index may then be used to satisfy a subsequent query, rather than having to compute the aggregate expressions from columns of the tables referenced in the query.

A partial covering method makes use of the functional dependency among columns in the dimension tables to allow an AJI to be used when its grouping key set functionally determines the grouping key set in the query. The method may be used in some embodiments to increase the usage of AJIs that are not at the lowest level of aggregation in a star schema. Star schemas are frequently used to represent the logical structure of a relational database. The basic premise of star schemas is that information can be classified into two groups: facts and dimensions. Facts are the core data elements being analyzed. For example, units of individual item sold are facts, while dimensions are attributes about the facts. Example dimensions may include the product types purchased and the date of purchase. Business questions against this schema are asked looking up specific facts (UNITS) through a set of dimensions (MARKETS, PRODUCTS, PERIOD). The central fact table is typically much larger than any of its dimension tables.

AJIs at higher levels in the hierarchy of the dimension tables are of smaller sizes and may be used to achieve better performance. Currently, such an AJI is not considered for queries with aggregates at lower level because it is not possible to roll up from it directly. In some embodiments, the method leverages hierarchy information stored in the dimension table, automatically rolls up the dimension table when necessary and fetches a grouping key on the fly by a join.

FIG. 1 illustrates an exemplary hardware and software environment that could be used to implement the partial covering method utilizing AJIs. A computer system 100 may be comprised of one or more processing units (PUs) 102, also known as processors or nodes, which may be interconnected by a network 104. Each of the PUs 102 may be coupled to zero or more fixed and/or removable data storage units (DSUs) 106, such as disk drives, that store one or more relational databases. Further, each of the PUs 102 may be coupled to zero or more data communications units (DCUs) 108, such as network interfaces, that communicate with one or more remote systems or devices.

Operators of the computer system 100 typically use a workstation 110, terminal, computer, handheld wireless device or other input device to interact with the computer system 100. This interaction generally comprises queries that conform to a Structured Query Language (SQL) standard, and invoke functions performed by a Relational Database Management System (RDBMS) executed by the system 100. In further embodiments, the computer system 100 may implement on-line analysis processing (OLAP) or multidimensional OLAP (MOLAP) or relational OLAP (ROLAP). Various other processing systems may also be implemented by computer system 100 or other computer systems capable of providing access to relational databases.

In one embodiment, the RDBMS comprises the Teradata® product offered by Teradata US, Inc., and may include one or more Parallel Database Extensions (PDEs) 112, Parsing Engines (PEs) 114, and Access Module Processors (AMPs) 116. These components of the RDBMS perform the function which enable of RDBMS and SQL standards, i.e., definition, compilation, interpretation, optimization, database access control, database retrieval, and database update.

Work may be divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

In various embodiments, data partitioning and repartitioning may be performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the methods or elements of the present invention to be performed.

As noted above, many different hardware and software environments may be used to implement the methods described herein. A spectrum of embodiments ranging from stand alone processors with a single storage device, to multiple distributed processors with distributed storage devices storing one or more databases may be used in various embodiments.

In one example embodiment of a partial covering method utilizing AJIs, a star schema with the fact table may be defined as:

Sales (day_id, prod_id, store_id, sales_amount);
Considering a time dimension:
Calendar (day_id, week_of_calendar, week_of month, month_of_calendar . . . );

There is an AJI defined at the week level in structured query langage (SQL) as:

```
CREATE JOIN INDEX AJI_week AS
SELECT week_of_calendar, week_of_month, SUM (sales_amount) AS
weekly_subtotal
FROM Sales S, Calendar C
WHERE S.day_id = C.day_id
GROUP BY week_of_calendar, week_of_month;
```

For a query that asks the aggregate at the month level:

```
SELECT month_of_calendar, SUM (sales_amount)
from sales S, Calendar C
where S.day_id = C.day_id
group by C.month_of_calendar;
```

AJI_week can be used through the following query rewrite:

```
SELECT DT.month_of_calendar, SUM (A.weekly_subtotal)
FROM AJI_week A,
(SELECT week_of_calendar, week_of_month, month_of_calendar
FROM Calendar
 GROUP BY
 week_of_calendar, week_of_month, month_of_calendar) DT
(week_of_calendar, week_of_month, month_of_calendar)
WHERE A.week_of_calendar = DT.week_of_calendar and
A.week_of_month = DT.week_of_month
GROUP BY DT.month_of_calendar;
```

There are two things that worth noticing in the above rewrite. A join with the dimension table may be done before rolling up the AJI to the higher level. Because AJI_week is at the week level and the month_of_calendar column is not included in its grouping keys, there is no way to roll up from AJI_week directly. A join is needed between AJI_week and the dimension table in order to get the higher level grouping key.

Also, a rollup of the dimension table is done before joining with the AJI. The join between the AJI and the dimension table may ensure that each group in the AJI gets its corresponding higher level grouping key correctly. It means that there should be no duplicates introduced by this join. As the calendar table is at the day level with day_id being its primary key (PK), it may be rolled up to the week level so that (week_of_calendar, week_of_month) becomes the PK of the rolled up derived table.

The automatic roll-up of the dimension table uses the union of the grouping key in the AJI and that in the query as its grouping key. It is guaranteed that the whole grouping key column set is the PK of the derived table. But in order to ensure that a subset of the grouping key, i.e. the part corresponding to the grouping key in the AJI, is the PK of the derived table, another constraint must be enforced. That is, there is a 1 to many relationship between the grouping key of the AJI and that of the query. In other words, the grouping key of the query may have a function dependency on that of the AJI.

Some sample data of the rolled up calendar table is illustrated in this example:

```
SELECT week_of_calendar, week_of_month, month_of_calendar
FROM sys_calendar.calendar
WHERE Calendar_date between '2006-01-01' and '2006-03-30'
GROUP BY 1, 2, 3
ORDER BY 1, 2, 3;
```

Three columns are indicated in TABLE 1 below, a number corresponding to the week of the calendar, a number corresponding to the week of the month, and a number corresponding to the month of the calendar.

TABLE 1

| week_of_calendar | week_of_month | month_of_calendar | |
|---|---|---|---|
| 5531 | 1 | 1273 | |
| 5532 | 2 | 1273 | |
| 5533 | 3 | 1273 | |
| 5534 | 4 | 1273 | |
| 5535 | 0 | 1274 | <=== the same week spans |
| 5535 | 5 | 1273 | <=== between two months |
| 5536 | 1 | 1274 | |
| 5537 | 2 | 1274 | |
| 5538 | 3 | 1274 | |
| 5539 | 0 | 1275 | |
| 5539 | 4 | 1274 | |
| 5540 | 1 | 1275 | |
| 5541 | 2 | 1275 | |
| 5542 | 3 | 1275 | |
| 5543 | 4 | 1275 | |

Because some weeks span between two months (such as the 5535th week), month_of_calendar doesn't have a function dependency on the column week_of_calendar alone. If AJI_week is defined with just week_of_calendar as its grouping key, one can not roll up from the day level calendar table to a week level calendar table in which every entry in the AJI finds its unique counterpart. However, when both week_of_calendar and week_of_month are included in the grouping keys, a rolled up calendar table at the week level may be obtained with (week_of_calendar, week_of_month) being its PK. The reasoning is based on the following:

A. (week_of_calendar, week_of_month, month_of_calendar) is the PK of DT;

B. month_of_calendar is functionally dependent on (week_of_calendar, week_of_month);

C. (week_of_calendar, week_of_month) is the PK of DT. It is assumed that the columns under considerations are defined as NOT NULL.

The conclusion of C follows the assumptions of A and B. Otherwise, if there are two rows with identical (week_of_calendar, week_of_month) pairs, their month_of_calendar values must be the same due to the function dependency. This violates assumption A.

For discussion of an example partial covering method, Assume that there are L columns in the dimension table:
Dim ($C_i$, i=1 ... L)

The grouping key set in the query Q is composed of M columns:
$GK_Q$ ($C_j$, j=1 ... M)
The grouping key set in the AJI is composed of N columns:
$GK_{AJI}$ ($C_k$, k=1 ... N)

Figure 2:
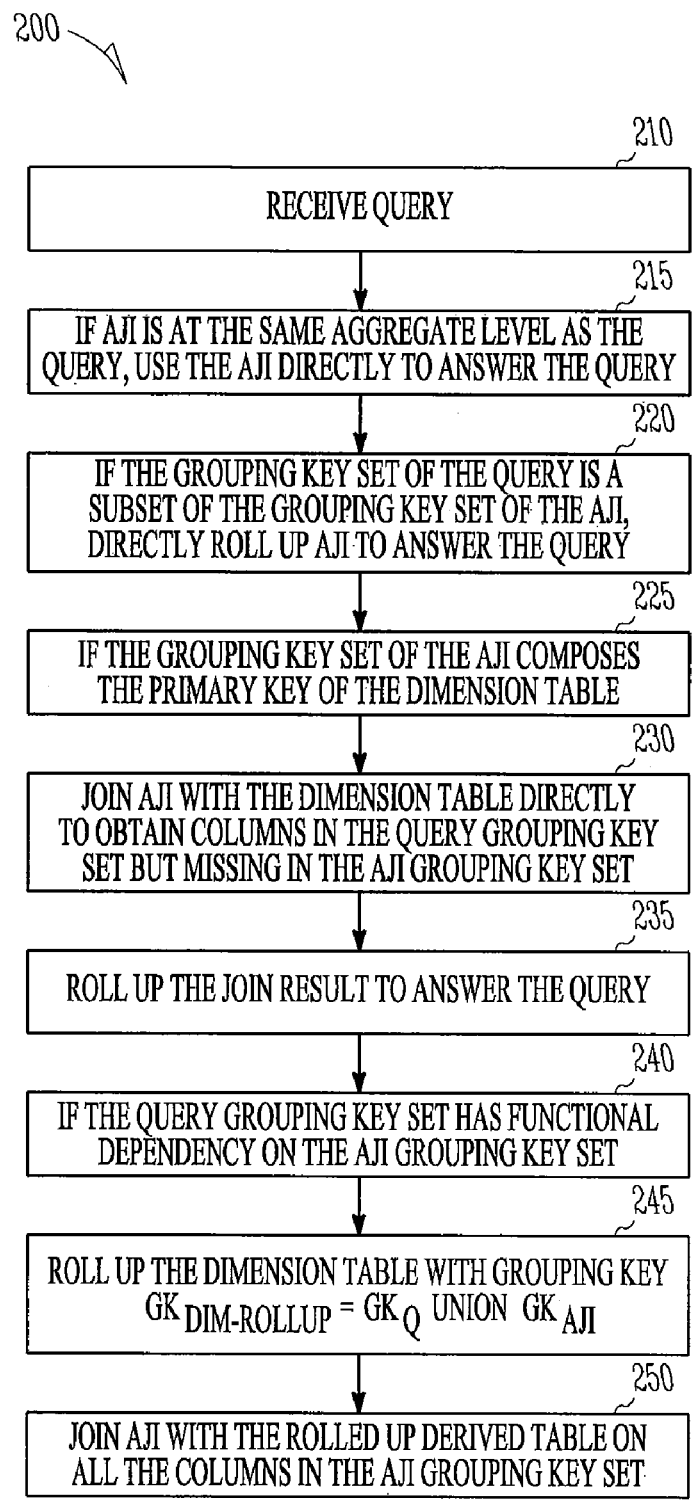
FIG. 2 is a flowchart illustrating a method of using an aggregate join index for a query according to an example embodiment.

An example partial covering method may then be described as follows utilizing three cases as illustrated in the flowchart of FIG. 2 at 200. A query is received at 210:

If ($GK_Q = GK_{AJI}$) (case I) at 215.
  AJI is at the same aggregate level as Q so AJI can be used directly to answer Q.
  It is assumed that other criteria that are required for AJI coverage are satisfied;
Else If ($GK_Q$ is a subset of $GK_{AJI}$) (case II) as indicated at 220
  AJI contains the grouping keys of Q so AJI can be directly rolled up to answer Q;
Else
  If ($GK_{AJI}$ composes the PK of the dimension table) (case III) as indicated at 225
    Since any other column or column set in the dimension table has function dependency on the PK, the AJI can be joined at 230 with the dimension table directly to get other columns that are in $GK_Q$ but missing in $GK_{AJI}$. Then a rollup of the join result at 235 can be used to answer Q;
  Else If ($GK_Q$ has functional dependency on $GK_{AJI}$) (case IV) as indicated at 240
    Roll up the dimension table at 245 with grouping key $GK_{dim-rollup}$ = $GK_Q$ UNION $GK_{AJI}$;
    Join AJI at 250 with the rolled up derived table on all the columns in $GK_{AJI}$;

Notice that in above method, case III illustrates that the AJI should contain the PK of the dimension table in order to join back with it. If the physical data model used in a RDBMS is star schema, in which the dimension tables are denormalized (usually in 2NF), AJI must be created at the lowest level in a dimension. In case III, the AJI can be created at a higher level in a snowflake schema, in which the dimension tables are normalized (usually to 3NF) so that each table contains the PK corresponding to the level that it represents. Notice that case IV won't apply in a snowflake schema because there is no function dependency existing between non-key columns in a 3NF table. However, when $GK_{AJI}$ doesn't compose the PK of the dimension table (case IV), the AJI may still be used by rolling up the dimension table automatically, leveraging the hierarchy information stored in the dimension table. One benefit of this embodiment of the method is that in a star schema, the AJI doesn't need to be always at the lowest level in order for vertical partial covering. The AJI can be at any level in the hierarchy as long as the AJI grouping key set forms the PK of the rolled up table derived from the dimension table. The higher the aggregate level, the smaller the AJI table, the faster the response time.

The availability of the functional dependency information in the dimension table is utilized in the partial covering methods. In some embodiments, stored column correlation information in a RDBMS may be leveraged for the implementation of the partial covering methods.

Figure 3:
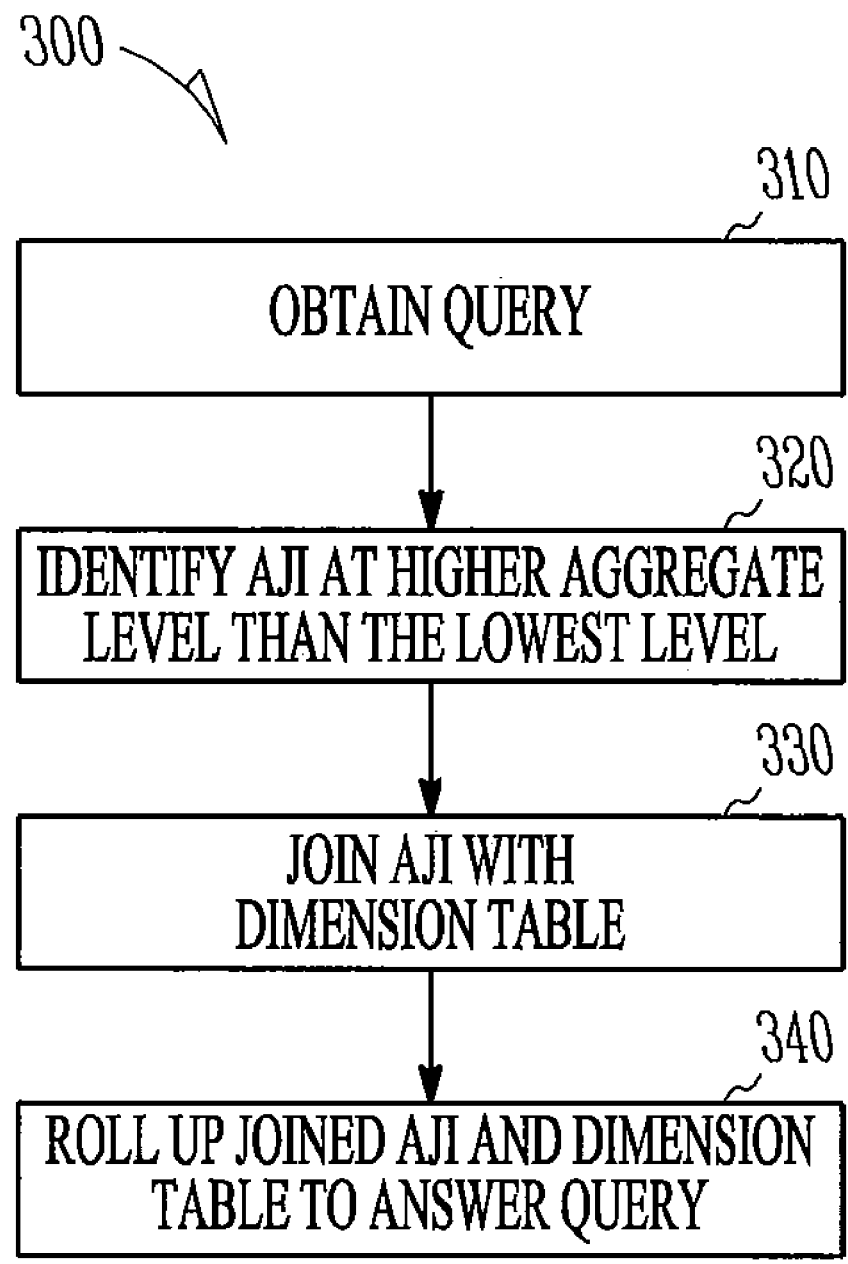
FIG. 3 is a flowchart illustrating a further method of using a higher level aggregate join index for a query according to an example embodiment.

In a further embodiment, an example method 300 is illustrated in a flowchart in FIG. 3. At 310, a query is obtained. The query may be obtained from a user or from stored queries that may be run periodically, or from any other source. It may also be an optimized query provided by a query optimizer. At 320, an AJI at a higher level of aggregation than the lowest level is identified because the AJI used should still be at the lower level than that in the query. The identified AJI is then joined with a dimension table at 330 to obtain columns in the query that are not in the identified AJI. At 340, the joined AJI and dimension table are rolled up to answer the query.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method comprising:
   obtaining a query;
   identifying an AJI at a certain level of aggregation;
   rolling up the dimension table with the grouping key being the union of the grouping key in the AJI and the grouping key of the query;
   joining the identified AJI with the rolled-up dimension table to obtain columns in the query that are not in the identified AJI;
   rolling up the joined AJI and rolled-up dimension table to answer the query.

2. The method of claim 1 wherein if a grouping key of the query is a subset of a grouping key of the AJI, directly rolling up the AJI to answer the query.

3. The method of claim 1 wherein the join between the AJI and the rolled-up dimension table ensures that no duplicates are introduced by the join.

4. The method of claim 1 wherein the rollup of the joined AJI and rolled-up dimension table uses a union of a grouping key in the AJI and a grouping key of the query as its grouping key.

5. The method of claim 4 wherein the grouping key of the query has a function dependency on the grouping key of the AJI.

6. A method comprising:
   obtaining a query that specifies an aggregate at a first level and has a grouping key;
      identifying an aggregate join index (AJI) at a higher level of aggregation, wherein the AJI does not contain the grouping key of the query;
   rolling up the dimension table with the grouping key being the union of the grouping key in the AJI and the grouping key of the query;
   joining the identified AJI with the rolled up dimension table to obtain columns in the query that are not in the identified AJI;
   rolling up the joined AJI and dimension table to answer the query.

7. The method of claim 6 wherein an AJI at higher levels of aggregation is smaller than an AJI at a lower level of aggregation.

8. The method of claim 6 wherein the join between the AJI and the rolled-up dimension table ensures that each group in the AJI has its corresponding higher level grouping key correctly and that no duplicates are introduced by the join.

9. The method of claim 6 wherein the rollup uses a union of a grouping key in the AJI and the grouping key of the query as its grouping key.

10. The method of claim 9 wherein the grouping key of the query has a function dependency on the grouping key of the AJI.

11. A computer readable storage medium having instructions stored thereon to cause a computer to execute a method comprising:
    obtaining a query that specifies an aggregate with a grouping key;
    identifying an aggregate join index (AJI) that does not contain the grouping key of the query;
    rolling up the dimension table with the grouping key being the union of the grouping key in the AJI and the grouping key of the query;
    joining the identified AJI with the rolled up dimension table to obtain columns in the query that are not in the identified AJI;
    rolling up the joined AJI and dimension table to answer the query.

12. The computer readable medium of claim 11 wherein the join between the AJI and the rolled-up dimension table ensures that each group in the AJI has its corresponding higher level grouping key correctly and that no duplicates are introduced by the join.

13. The computer readable medium of claim 11 wherein the rollup uses a union of a grouping key in the AJI and the grouping key of the query as its grouping key.

14. The computer readable medium of claim 13 wherein the grouping key of the query has a function dependency on the grouping key of the AJI.

15. A system comprising:
    one or more processing units;
    one or more data storage units coupled to the one or more processors;
    one or more optimizers executing on the one or more processing units that are configured to:
      obtain a query that specifies an aggregate with a grouping key;
      identify an aggregate join index (AJI) that does not contain the grouping key of the query;
      roll up the dimension table with the grouping key being the union of the grouping key in the AJI and the grouping key of the query;
      join the identified AJI with the rolled up dimension table to obtain columns in the query that are not in the identified AJI;
      roll up the joined AJI and dimension table to answer the query.

16. The system of claim 15 wherein the join between the AJI and the rolled-up dimension table ensures that each group in the AJI has its corresponding higher level grouping key correctly and that no duplicates are introduced by the join.

17. The system of claim 15 wherein the rollup uses a union of a grouping key in the AJI and the grouping key of the query as its grouping key.

18. The system of claim 17 wherein the grouping key of the query has a function dependency on the grouping key of the AJI.

* * * * *